(12) United States Patent
Moya

(10) Patent No.: US 6,167,960 B1
(45) Date of Patent: Jan. 2, 2001

(54) PROTECTION OF DOWNWELL PUMPS FROM SAND ENTRAINED IN PUMPED FLUIDS

(76) Inventor: Emmanuel G. Moya, 9275 N. Boyd, Fresno, CA (US) 93720

(*) Notice: Under 35 U.S.C. 154(b), the term of this patent shall be extended for 0 days.

(21) Appl. No.: 09/135,515

(22) Filed: Aug. 17, 1998

(51) Int. Cl.$^7$ .............................. E21B 43/00; E21B 43/38
(52) U.S. Cl. ........................................ 166/105.1; 166/106
(58) Field of Search ................................ 166/105, 105.1, 166/106, 265

(56) References Cited

U.S. PATENT DOCUMENTS

| | | |
|---|---|---|
| 1,720,863 | 7/1929 | Stebbins . |
| 2,114,780 | 4/1938 | Juelson . |
| 2,158,717 | 5/1939 | Brock . |
| 2,662,486 * | 12/1953 | Hillger ................................ 166/105 |
| 2,732,032 | 1/1956 | Sandison . |
| 2,744,721 | 5/1956 | Hatch . |
| 3,289,608 * | 12/1966 | Laval, Jr. ........................... 166/105.1 |
| 3,512,651 | 5/1970 | Laval, Jr. . |
| 3,944,380 | 3/1976 | Kampe . |
| 3,963,073 * | 6/1976 | Laval, Jr. ........................... 166/105.1 |
| 4,047,912 | 9/1977 | Markland . |
| 4,066,552 | 1/1978 | Caine . |
| 4,072,481 | 2/1978 | Laval, Jr. . |
| 4,148,735 * | 4/1979 | Laval, Jr. ....................... 166/105.1 X |
| 4,155,681 | 5/1979 | Linko, III et al. . |
| 4,362,478 * | 12/1982 | Huckaby ......................... 166/105 X |
| 4,588,351 | 5/1986 | Miller . |
| 4,971,518 | 11/1990 | Florin . |
| 5,000,769 | 3/1991 | Raguideau et al. . |
| 5,033,545 * | 7/1991 | Sudol ............................... 166/105 X |
| 5,277,232 | 1/1994 | Borsheim . |
| 5,368,735 | 11/1994 | Ford . |
| 5,553,669 * | 9/1996 | Trainer ............................. 166/105.1 |
| 5,662,167 * | 9/1997 | Patterson et al. .................... 166/265 |

* cited by examiner

Primary Examiner—George Suchfield

(57) ABSTRACT

A separation system for protecting a pump disposed in a well. The separation system separates sand from the well fluid prior to pumping of the well fluid. The separated sand, or other particulates is routed past the pump used in producing the desired well fluid. The sand is then reinjected into the produced fluid stream at a location downstream of the pump.

2 Claims, 2 Drawing Sheets

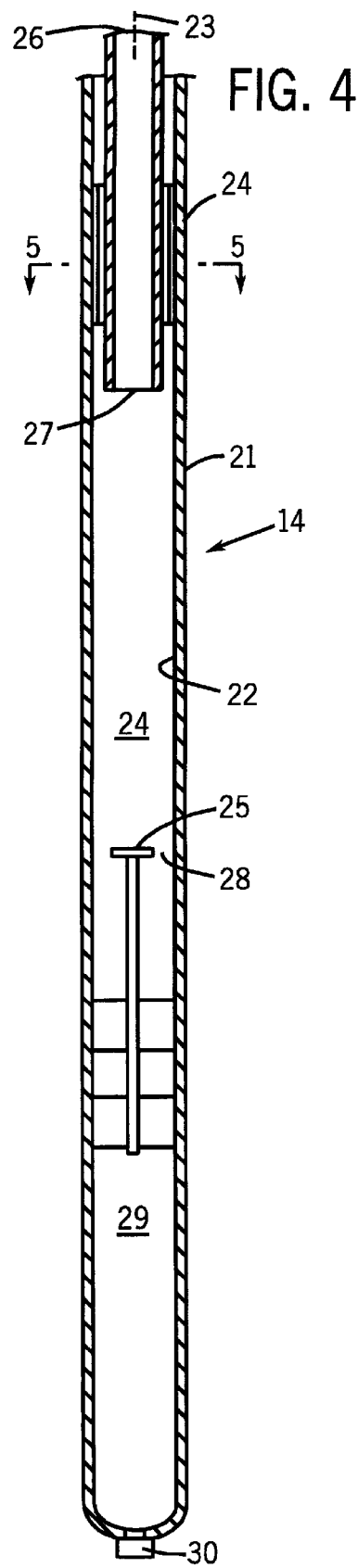
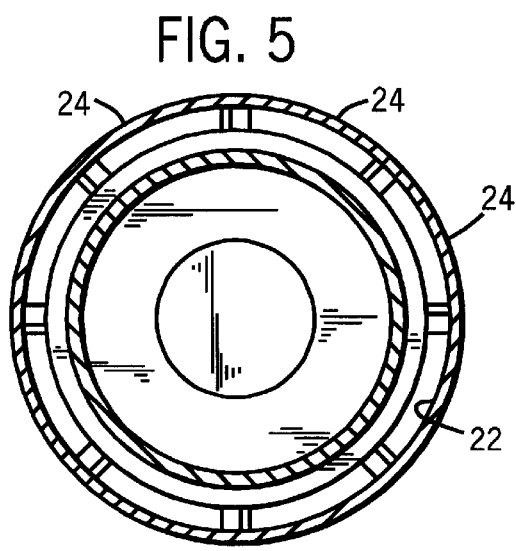

PROTECTION OF DOWNWELL PUMPS FROM SAND ENTRAINED IN PUMPED FLUIDS

FIELD OF THE INVENTION

Protection of downwell pumps from damage by sand which is entrained in fluids to be pumped, for example oil or water from oil wells and water wells in sandy formations.

BACKGROUND OF THE INVENTION

Downwell pumps are placed in a well near its bottom, for providing pressure to move well fluid to the surface. Examples are oil wells and water wells, where the pump draws well fluids from the surrounding formation. Commonly such formations include sand which abrasively wears the pump structure when it passes through the pump. This requires much more frequent pump service than if the pump were pumping a similar fluid without sand in it.

Removal and replacement of a downwell pump is costly both in labor and in production lost due to down time of the well.

The usefulness of screens to protect the pump is more theoretical than actual because of the tendency of screens to clog. Centrifugal separators have proved to be far superior for downhole work, and are exemplified for this purpose by Laval Jr. U.S. Pat. Nos. 3,289,608 and 4,072,481, which are incorporated herein by reference in their entirety for their showing of useful structures and utility.

While these show a suitably effective separation of sand ahead of the inlet of the pump, they leave unsolved the optimum disposition of the separated sand. In one embodiment the sand is simply returned to the well, where it can contribute to plugging the formation.

In another, the sand is flushed from a T into a fluid stream that joins the output fluid from the pump on its way to the surface. The problem faced by this arrangement is the possibility that the sand outlet may become plugged or overloaded. In that event, the system will have to be raised to the surface and cleaned out. This is an expensive situation which is intended to be avoided by this invention.

BRIEF DESCRIPTION OF THE INVENTION

A system according to this invention includes a centrifugal separator of the type which has an internal cylindrical wall along which a rapid flow of fluid circulates in a helical pattern from an inlet port that directs the rapidly flowing stream tangentially along the cylindrical wall. This flow continues until it encounters a spin plate.

The spin plate reverses the axial direction of stream flow which then flows centrally in the opposite direction to and out of an outlet port. Sand that is moved toward the wall by the centrifugal force flows through a gap near the spin plate, and into a lower sand collection chamber, accompanied by some liquid to form a sand-enriched flow. The pump draws the sand-free flow from the outlet port of the separator. This results in an incoming flow of sand-laden fluid into the inlet port of the separator.

According to a feature of this invention, an ejector having a flow passage with a reduced injector section and an ejection port into it, receives a pumped flow of sand free liquid from the pump through a conduit that receives liquid from the pump outlet and returns it to the effluent stream. The ejection port is connected to the outlet from the sand collection chamber. A backflush nozzle is spaced from and faces the injection port to direct a liquid stream into it in the event it is clogged.

According to a preferred but optional feature of the invention, a check valve communicating with the outlet port of the sand collection chamber diverts sand from the ejector port in the event the injection port or the outlet becomes clogged.

There results a sand separator system which is resistant to clogging, while protecting the pump from sand.

The above and other features of this invention will be fully understood from the following detailed description and the accompanying drawings, in which:

BRIEF DESCRIPTION OF THE DRAWINGS

FIG. 4 is an axial cross-section of the separators; and

FIG. 5 is a cross-section taken at line 5—5 in FIG. 4.

DETAILED DESCRIPTION OF THE INVENTION

Figure 1:
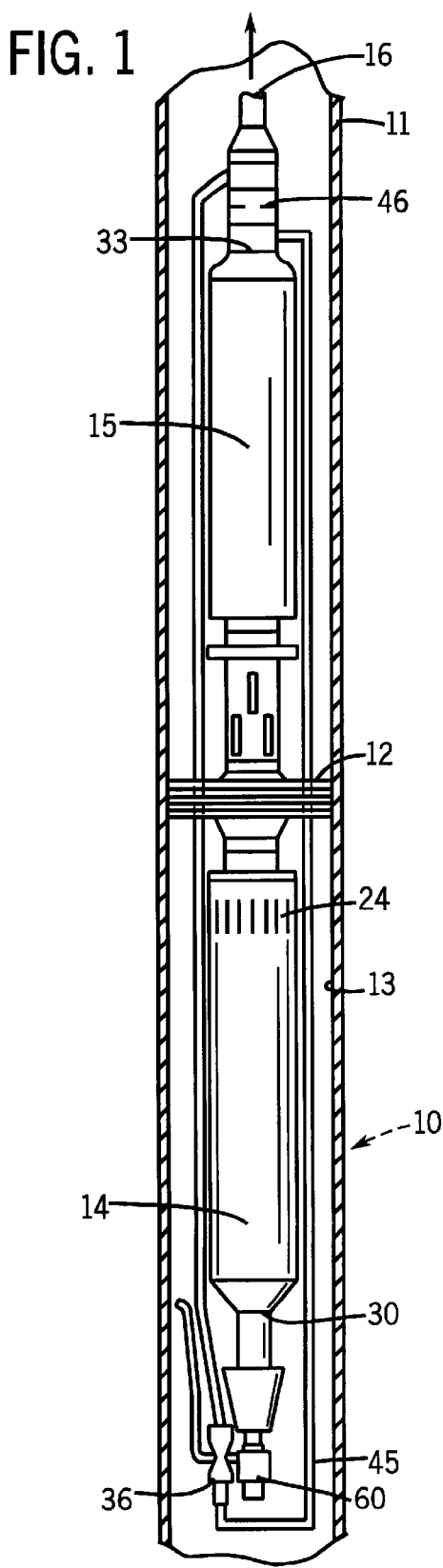
FIG. 1 is a vertical, axial view partly in cross-section showing the presently preferred embodiment of the invention.

A pump protection system 10 according to this invention is shown installed in a well casing 11 that receives well fluids through perforations (not shown) in its wall, or through the bottom open end of the casing. A packer 12 forms a fluid seal between the inside wall 13 of the casing and the outside wall of a centrifugal separator 14. The pumping of fluids from beneath the packer to the surface is the objective of the system.

A downwell pump 15 is connected to the separator. A production pipe 16 connected to the pump conveys pumped fluid to the surface.

The pump is driven by any suitable device, usually an electric motor (not shown). This motor provide the energy for the entire system.

The separator 14 is a classic centrifugal type such as shown in Laval Jr. U.S. Pat. No. 4,072,481, which is incorporated herein and made part hereof by reference in its entirety for its showing of the construction theory, and operation of such a separator. FIGS. 4 and 5 will be recognized in this patent. As best shown in FIG. 4, it has an elongated body 21 with an internal cylindrical wall 22 extending along a central axis 23.

An slit-like entry nozzles 24 through the wall of the casing are directed tangentially along wall 22. The nozzles are located near the top of a separator chamber 24A so that liquid flows helically at a high speed down the wall until it strikes a spin plate 25. When the rapidly rotating stream strides the spin plate, it continues its rotating motion, but reverses its axial direction so that it flows as a central stream inside the downwardly progressing stream and flows out an upper central outlet port 26 in an outlet tube 27.

As the consequence of the rapid velocity of the downward stream, the sand, which has a larger specific gravity than the fluid, migrates toward the wall where the stream reaches the spin plate there is a peripheral gap 28 around the plate. The sand accompanied by some fluid, flows through this gap into a sand collection chamber 29. A collection chamber outlet 30 is formed at the bottom of the collection chamber.

Pump inlet 33 (FIG. 1) is connected to outlet port 26 of the separator to draw fluid from the separator and drive it upwardly through production pipe 16. This movement of fluid causes the incoming flow through the nozzles, and thereby drives the separator.

Figure 2:
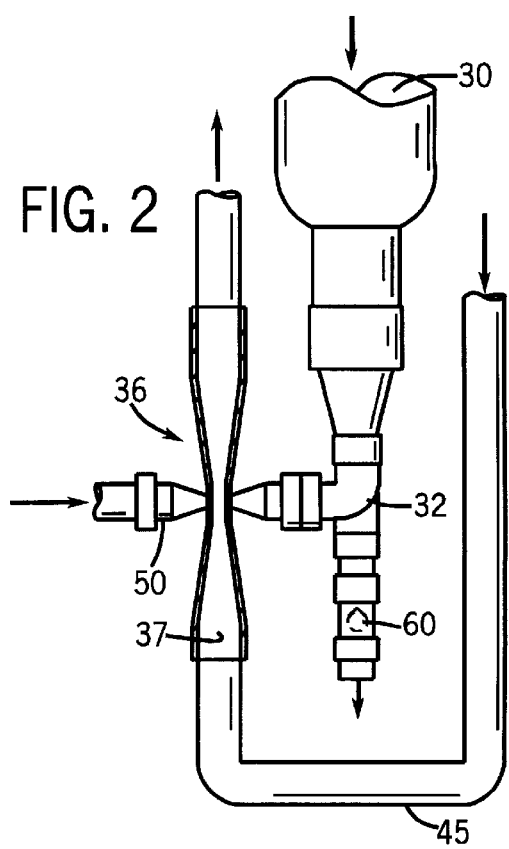
FIG. 2 is a fragmentary view of a lower portion of FIG. 1, partly in cross section.
Figure 3:
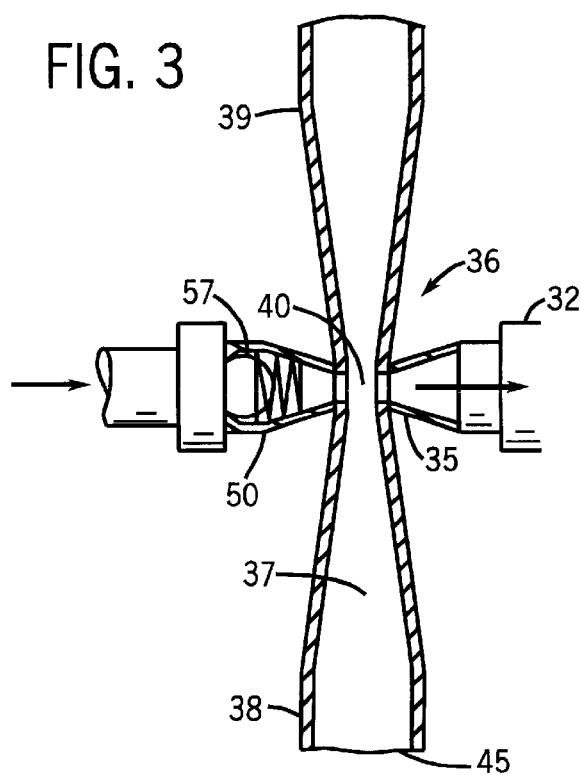
FIG. 3 is an enlarged view of a portion of FIG. 2.

A sand by-pass ejector conduit 32 (FIG. 2) discharges sand laden liquid from outlet 30 into injector port 35 of an ejector 36. Ejector 36 is a conventional venturi type having a flow passage 37 from its inlet end 38 to its outlet end 39. Conduit 32 drains sand-laden liquid from the collection chamber to the injector port. The ejector includes a reduced section 40 into which the ejector port opens. A reduced pressure in section 40 draws the sand-laden stream into the flow through passage 37.

A sand by-pass conduit 45 draws liquid under pressure from the pump outlet, and discharges into the ejector's flow passage. It continues to discharge into the effluent stream from the pump to join the outlet stream to the surface. An orifice plate 46 is placed in the effluent stream between the points of entry and reentry of the sand by-pass conduit to provide a differential pressure that will drive the liquid stream through the ejector.

A flush nozzle 50 discharges into reduced section 40 directly toward ejector port 35. It is supplied by a source (not shown) of water under pressure to provide a stream to clear the injector port of sand. A spring loaded ball check valve 51 is loaded closed and will remain closed unless the pressure in the reduced section drops, perhaps by 5 psi below the equivalent head of water for that depth. Then it will open and back flush the ejector port.

Also, and optionally, should the system become even more clogged, a spring loaded check valve 60 below the exit port from the sand collection chamber will open when the pressure exceeds that which is normal. This sand laden material will be discharged directly into the well.

The result of this arrangement is that the pump works only on sand free fluid, and the entire production (including the sand) is lifted to the surface. Pump wear from sand is virtually eliminated.

This invention is not to be limited by the embodiment shown in the drawings and described in the description, which is given by way of example and not of limitation, but only in accordance with the scope of the appended claims.

What is claimed is:

1. A sand by-pass system to protect a pump disposed in a well from wear by sand present in a fluid stream to be pumped to the surface, said system comprising:

a centrifugal separator of the type having an internal cylindrical wall bounding a separation chamber, said wall and chamber having a coincident central axis, an inlet nozzle through said wall for directing a fluid stream tangentially along said wall, a central outlet port, a spin plate axially spaced from said inlet nozzle, extending laterally in said chamber, a sand collector chamber beneath said separator chamber, and a gap between said cylindrical wall and said plate axially spaced from said inlet port for passage of sand-enriched fluid from the separation chamber into the said collection chamber;

a pump having a pump inlet connected to the outlet port of the separator and a pump outlet;

a production pipe connected to the pump outlet;

a sand by-pass ejector conduit connected to an outlet from said sand collection chamber;

an ejector having a flow passage, a reduced section, and an ejector port entering said reduced section, said sand by-pass ejector conduit discharging into said ejector port;

a nozzle entering said reduced section opposite to an and directed toward said ejector port to direct a stream of liquid into said ejector port to unclog it, said nozzle including a unidirectional flow check valve and a source of liquid under pressure;

a by-pass conduit connecting said flow passage to the pump outlet, and to the production pipe at two locations downstream form the pump outlet, with an orifice plate in said production pipe between the points of connection of the by-pass conduit to said production pipe to provide a differential pressure to cause a flow of liquid through said by-pass conduit;

a packer between the system and the well casing above the said nozzle; and whereby operation of said pump draws fluid from the outside of the separator chamber to cause helical flow of fluid along the cylindrical wall and central flow and through the separator outlet port and through the pump to the production pipe, a sand-enriched fluid flow passing through said sand collection chamber and said sand by-pass ejector conduit into said by-pass conduit.

2. Apparatus according to claim 1 in which a unidirectional check valve is plumbed into said sand by-pass ejector conduit, spring-loaded to release sand-laden liquid into the well casing when the pressure thereof exceeds a predetermined level.

* * * * *